Oct. 9, 1934.  J. BECH  1,975,916
MACHINE FOR PRODUCING SQUARE HAMS
Filed Feb. 15, 1932  5 Sheets-Sheet 1

Fig.1

Joseph Bech
INVENTOR

WITNESS

BY 
ATTORNEY

Oct. 9, 1934.   J. BECH   1,975,916
MACHINE FOR PRODUCING SQUARE HAMS
Filed Feb. 15, 1932   5 Sheets-Sheet 2

Joseph Bech
INVENTOR

WITNESS

BY
ATTORNEY

Oct. 9, 1934.  J. BECH  1,975,916

MACHINE FOR PRODUCING SQUARE HAMS

Filed Feb. 15, 1932  5 Sheets-Sheet 5

Joseph Bech
INVENTOR

ATTORNEY

Patented Oct. 9, 1934

1,975,916

UNITED STATES PATENT OFFICE 1,975,916

MACHINE FOR PRODUCING SQUARE HAMS

Joseph Bech, Chicago, Ill., assignor to Swift and Company, Chicago, Ill., a corporation of Illinois Application February 15, 1932, Serial No. 593,055

18 Claims. (Cl. 100—57)

The invention relates to a machine for producing square hams.

The object of the present invention is to provide a simple, practical and efficient machine of strong, durable and comparatively inexpensive construction adapted to readily receive hams of the ordinary shape and capable of permitting the same to be readily arranged successively in a mold and compressing the hams into a square shape by a downward vertical movement of a piston operated plunger.

A further object of the invention is to provide a machine of this character adapted to enable a container to be easily and quickly arranged at one end of the mold and after the molding of the ham has been completed of readily forcing the ham from the mold into the container under a uniform pressure.

Another object of the invention is to enable the filled or packed container to be removed from the machine for cooking or processing the meat without entirely releasing the yieldable pressure on the ham so that the square shape of the ham will be maintained during cooking or processing.

With these and other objects in view, the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the accompanying drawings in which is illustrated the preferred embodiment of the invention, the machine for producing square hams comprises in its construction a main frame 1 designed to be constructed of angle iron or other suitable material and provided with spaced longitudinal rails 2 forming a track for a carriage 3 and suitably secured to transverse horizontal bars 4 which connect vertical side posts 5 and 6 of the main frame. The rails preferably consist of angle bars having horizontally arranged flanges secured to the connecting cross pieces 4 and vertical flanges which present upper tread portions 7 to grooved wheels 8 of the carriage 3.

Figure 1:
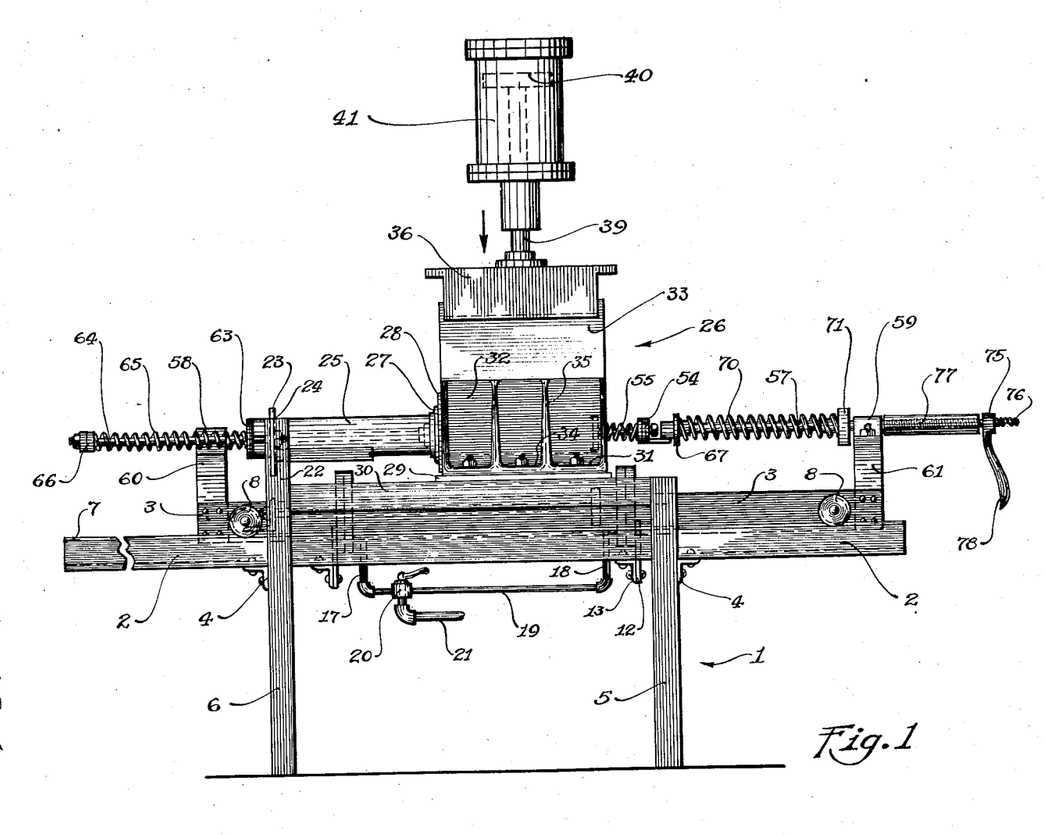
Figure 1 is a side elevation of a machine constructed in accordance with this invention for producing square hams.
Figures 2, 3:
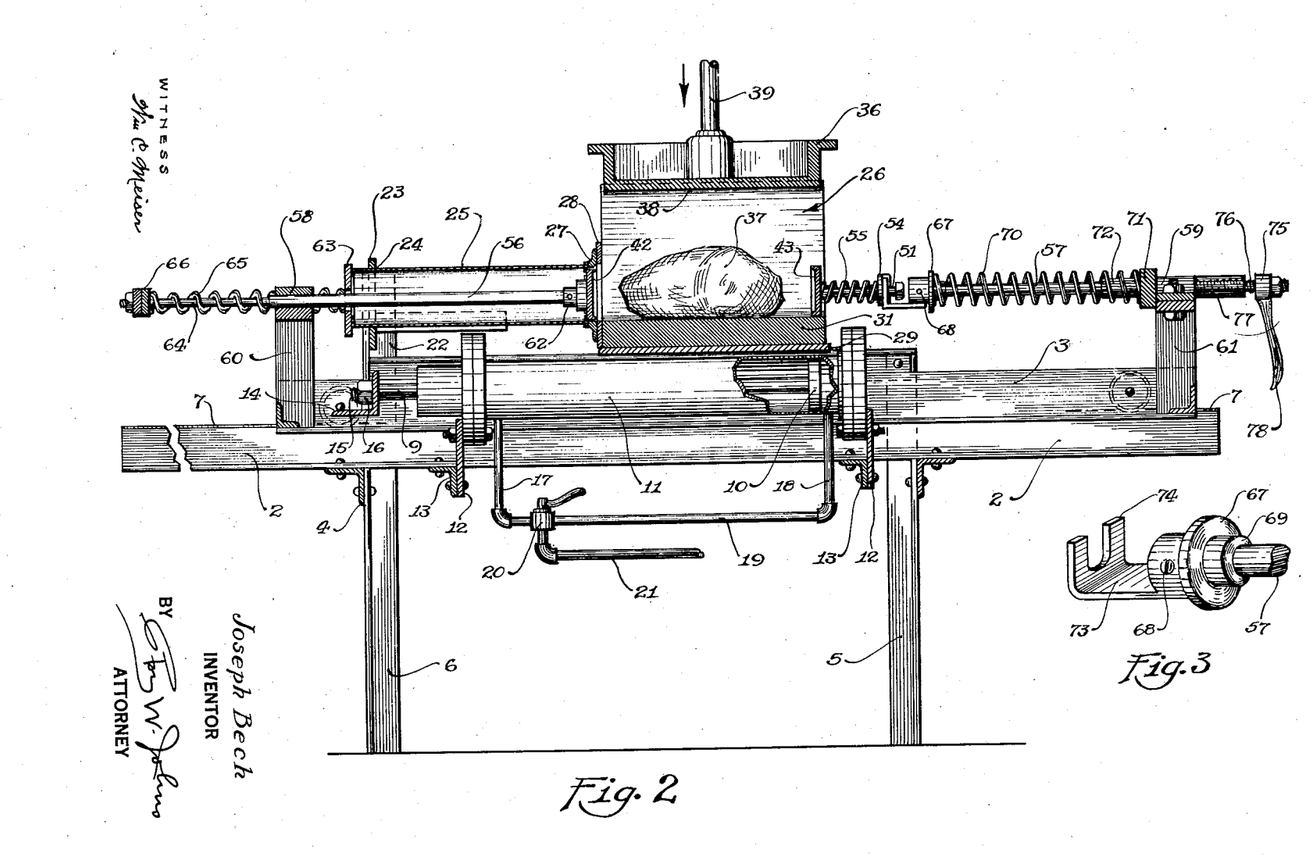
Fig. 2 is a central longitudinal sectional view of the same.
Fig. 3 is a detail perspective view of the pronged hook for detachably connecting one of the horizontal shafts with the shank end plate.

The horizontally movable carriage 3 which may be of any desired construction, preferably consists of the said grooved wheels and a frame composed of angle iron side pieces and suitably connecting cross pieces and connected adjacent one end with a piston 9 having a head 10 operating within the cylinder 11 disposed horizontally of the main frame and secured centrally thereof to transverse plates 12 which are secured to angle iron cross pieces 13 and extend upwardly therefrom, as clearly shown in Fig. 2 of the drawings. The cross pieces 13 also connect the horizontal rails 2 and are located at the lower faces of the horizontal flanges of the said rails. The piston consists of the said head 10 and a rod which is secured at its outer end to an angle iron cross piece 14 of the frame of the carriage. The angle iron cross piece has one of its flanges arranged horizontally and the other flange is arranged vertically and extends upwardly from the horizontal flange and is pierced by the outer end 15 of the piston rod which is reduced and threaded to receive a nut 16 which secures the piston rod to the frame of the carriage.

The piston is preferably operated by compressed air, but any other fluid pressure may, of course, be employed, and it is provided adjacent its ends with suitable ports to which are connected pipes 17 and 18 adapted to function alternately as exhausts and feed ports and connected by a longitudinal pipe 19 with a controlling valve 20. The controlling valve which may be of any desired construction is connected by a feed pipe 21 with a compressed air tank or other suitable source fluid pressure supply and the said controlling valve is adapted to be operated to admit fluid pressure to one end of the cylinder 11 and simultaneously exhaust pressure from the other end of the cylinder for causing the piston to travel towards the latter end. The control valve is also adapted to be operated to reverse the movement of the piston and also to hold the pressure within the cylinder for maintaining the carriage against movement during the molding operation and when placing the container in position and removing the same therefrom.

The legs 6 of the main frame are provided at the top with extensions 22 which support a transversely disposed frame plate 23 secured to transversely disposed webs or flanges of the said extensions 22. The frame plate 23 which extends across the main frame is provided with a centrally arranged opening 24 to receive and support one end of a can or container 25 adapted to be arranged in a horizontal position and longitudinally of the machine at one end of a mold 26 located approximately centrally of the machine.

Figure 4:
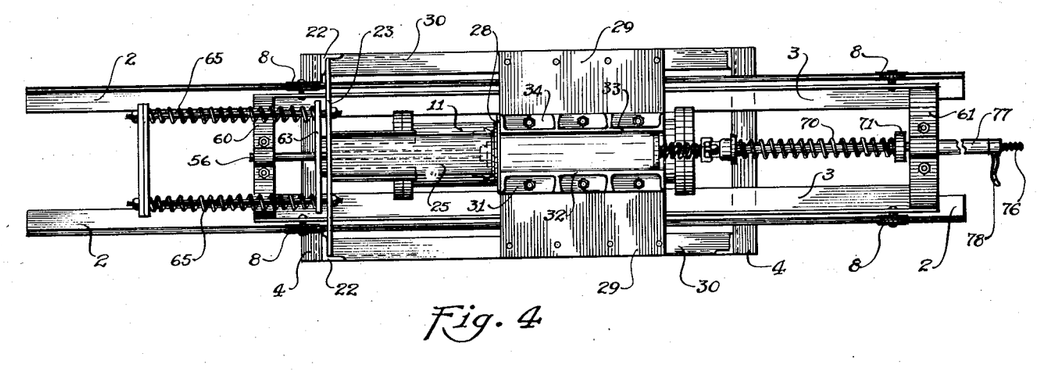
Fig. 4 is a plan view of the machine for producing square hams, the carriage being in normal position.

The frame plate supports the outer end of the container and the inner end of the container is fitted around a marginal lip 27 arranged around an opening in a contact plate 28 extending across one end of the mold, as clearly illustrated in Figs. 2 and 4 of the drawings.

The mold is supported upon a horizontal plate 29 extending across the main frame and secured to horizontal frame members 30 which connect the posts 5 and 6 above the horizontal plane of the treads of the rails. The mold which is open at the top and ends is composed of a base 31 and spaced vertical sides 32 and 33 preferably formed integral with the base which constitutes the bottom of the mold and which is provided with laterally extending horizontal attaching flanges 34 which are bolted or otherwise secured to the upper face of the horizontal plate 29. The sides 32 and 33 which present smooth vertical inner faces are reinforced at their outer faces by vertical webs 35 formed integral with the sides and extending from the upper edges of the sides to the base 31.

The side 33 extends above the side 32 and forms a guide for the plunger 36 guided by the extended side 33 of the mold when moved upwardly beyond the side 32 to provide an open space to afford access to the compression chamber of the mold to enable a ham 37 to be introduced into the mold substantially in the position illustrated in Fig. 2 of the drawings. The plunger is oblong and rectangular in cross section and presents flat vertical side faces to the sides of the mold and completely fills the space between the sides of the mold and extends longitudinally of the said space substantially the entire length of the same, as illustrated in Fig. 2 of the drawings.

Figure 7:
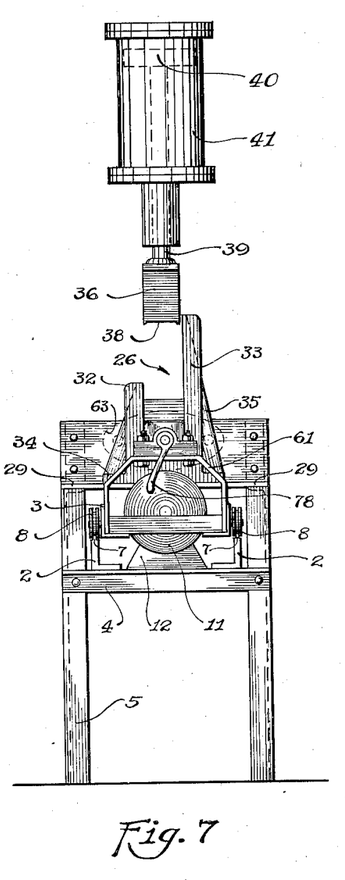
Fig. 7 is an end elevation of the machine.
Figure 8:
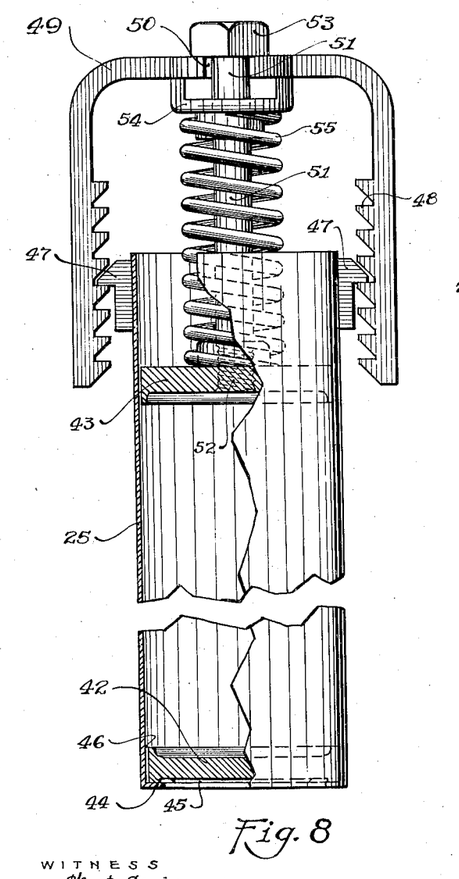
Fig. 8 is a longitudinal sectional view of the container, the means for maintaining yieldable pressure on a ham during processing being shown in elevation.

The lower face 38 of the plunger is dished transversely, as illustrated in Fig. 7 of the drawings, and the ham is placed in the mold with the butt end to the left and the shank to the right and is turned so that the thickest portion of the ham is in a vertical direction and reposes near the left hand end of the compression chamber.

The plunger 36 is suitably connected to the lower end of the rod 39 of a vertically movable piston 40 operating within a vertical cylinder 41 and preferably operated by compressed air, but any other fluid pressure may, of course, be employed for raising and lowering the piston and the plunger and for applying the necessary pressure to mold the ham 37 into a square shape cross sectionally.

Any suitable valve mechanism may be employed for controlling the admission and exhaust of fluid pressure to the cylinder 41, and a detailed illustration and explanation of the same is deemed unnecessary. The flat inner face of the extended side 33 will prevent any rotary movement of the plunger 36 which will be guided in its downward movement into the space or compression chamber between the sides 32 and 33 of the mold and the said plunger 36 in its upward movement is not carried beyond the top of the extended side 33 so that the latter always forms a guide for the plunger.

The ham 37 is compressed between a butt end plate 42 and a shank end plate 43 which have dished inner ham engaging faces providing a marginal flange and forming a cup-shaped cavity or recess to receive the ends of the ham. The transversely dished lower ham engaging face of the plunger 36 forms longitudinal marginal flanges at opposite sides of the lower ham engaging face of the plunger 36 and these faces cooperate in confining and holding the meat in the shaping or squaring of the hams.

Figure 9:
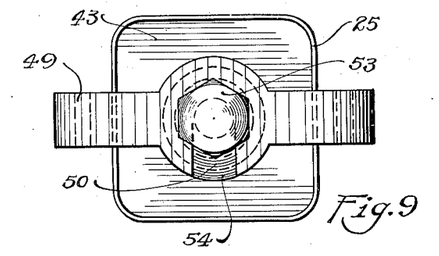
Fig. 9 is an end elevation of the same.

The container which is substantially square in cross section, as illustrated in Fig. 9 of the drawings, has rounded corners and is provided at its outer end with an inwardly extending marginal flange 44 which limits the outward movement of the butt end plate 42 when the ham 37 after being squared is forced out of the mold into the container as hereinbefore fully explained. The butt end plate is provided at its outer or lower face with four marginal cleats 45 which abut against the inwardly extending marginal flange 44 of the container when the butt end plate is at the limit of its outward movement. When the container is in a vertical position after being removed from the machine, the marginal flange 44 is at the bottom of the container. When the container is arranged in a horizontal position in the machine, as illustrated in Fig. 2 of the drawings and the squared ham has been pushed to the left hand end of the container the butt end plate closes the left hand end of the container except for a thin aperture 46 on each side of the butt plate formed by the cleats to permit escape of any free juices.

The container is provided at the right hand end with exterior lugs 47 preferably formed integral with cleats suitably secured to the container. The lugs are also preferably tapered and are adapted to engage correspondingly shaped lugs 48 of a yoke 49 composed of spaced sides and a connecting transverse portion which is centrally enlarged and provided with an open recess 50 adapted to fit over the outer portion of a bolt or headed stem 51.

The bolt 51 has a threaded inner or lower end 52 and the shank end plate 43 is drilled and tapped to receive the said threaded end 52. The bolt 51 is provided at its outer end with a polygonal head 53 and arranged on the bolt at the head end thereof is a spring pressure plate 54. A coiled spring 55 which is disposed on the bolt 51 is interposed between the shank end plate 43 and the spring pressure plate 54 which is provided with a reduced portion extending into the adjacent end of the coiled spring to seat the same on the pressure plate. The other end of the coiled spring bears against the shank end plate 43 which has a central boss to receive and center the inner or lower end of the said spring 55. The spring 55 is adapted as hereinafter fully explained to maintain a yielding pressure on the ham packed in the container while the ham is being processed or cooked so that the square shape of the ham will be preserved during such cooking or processing. The opening 50 in the transverse portion of the yoke provides for a detachable connection between the bolt and the yoke so that the yoke may be applied to the bolt and engaged with the lugs prior to the removal of the container from the machine and after the ham has been squared and forced out of the mold and into the container.

The butt end plate 42 and the shank end plate 43 in the operation of the machine are connected to the inner ends of aligned horizontal shafts or rods 56 and 57 guided at their outer portions in bearings 58 and 59 of pedestal members 60 and 61 of approximately inverted U-shaped formation, as clearly illustrated in Fig. 7 of the drawings.

The pedestal members extend across and arch the carriage and as illustrated in Fig. 7, have vertical side portions which are secured to the sides of the frame of the carriage. The top of the pedestal members has a central horizontal portion and inclines downwardly therefrom to the vertical sides, but any other suitable form of pedestal member may, of course, be employed. The longitudinal shaft 56 is provided at its inner end with a head 62 which fits against the butt end plate 42 in the operation of the machine, as clearly illustrated in Fig. 2 of the drawings, and the said shaft 56 is of a length to extend from the left hand end of the mold to the left hand end of the carriage.

The outer end of the container fits against the spring pressure plate 63 preferably of substantial oval shape, as shown, and disposed transversely of the frame of the machine and mounted on spaced horizontal guide rods 64 extending outwardly from the frame plate 23 at opposite sides of the container receiving opening and slidably receiving the said spring pressure plate 63 and having coiled springs 65 disposed on them and interposed between the spring pressure plate 63 and a transverse plate 66 extending across the space between and connecting the outer ends of the guide rods 64. The inner ends of the guide rods 64 pierce the frame plate 23 and are threaded for the reception of nuts and the outer ends of the said guide rods pierce the plate 66 and are threaded for the reception of nuts. The nuts and the outer threaded ends of the guide rods 64 provide convenient means for tensioning the coiled springs 65 which maintain a pressure on the plate 63 and against the outer end of the container 25 engaged by the said plate 63.

The springs yieldably maintain the container in the position illustrated in Fig. 2 of the drawings and exert sufficient pressure on the container to enable the ham 37 after it has been squared by the plunger 36 to be pushed into the container without danger of dislodging the same from the position shown in Fig. 2. As the squared ham is forced into the container the butt end plate 42 comes in contact with the marginal flange 44 at the outer end of the container 25.

The shaft 57 which is slidable in a bearing 59 is provided at its inner end with a head 67 preferably consisting of a sleeve secured on the inner end of the shaft 57 by a transverse fastening device 68 and having a reduced portion 69 receiving and centering the inner end of a coiled spring 70 which is interposed between the head 67 and an outer stop 71 preferably in the form of a head carried by a sleeve 72 arranged on and receiving the outer portion of the coiled spring. The spring 70 is of a strength equal to the combined strength of the springs 65 so that when the container with the squared ham therein is moved to the left from the position illustrated in Fig. 4 of the drawings to that shown in Fig. 5 of the drawings, the springs 65 and 70 will exert a uniform pressure on the meat. The head 67 is provided beyond the inner end of the shaft 57 with a pronged hook 73 consisting of a straight longitudinal shank and spaced transversely disposed bills 74 which are adapted to straddle the bolt 51 which is received in the space between the engaging portions or bills 74.

When the shank end plate is placed in the mold in the position illustrated in Fig. 2 of the drawings, the headed end of the bolt 51 is engaged with the pronged or bifurcated hook 74, as clearly illustrated in Fig. 2 of the drawings. The shank of the hook is laterally offset from the plane of the shaft 57 and the engaging portions of the hook extend transversely of the shaft 57 and the bolt 51 and fit against the spring pressure plate 54 so that after the plunger has moved downwardly to square the ham and the carriage is moved to the left for forcing the squared ham from the mold into the container the pronged hook will bear against the spring pressure plate 54 and the shank plate will be moved to the left under the tension of the spring 70 which will be acted on by the pedestal member at the right hand end of the carriage in Fig. 2 of the drawings. The movement of the carriage to the left will tend to compress the spring 70 which, acting on the head 67, will force the shank end plate to the left.

Before the container can be placed into the machine it is necessary to move the carriage to the left and this is effected by introducing compressed air into the cylinder 11 at the right hand end thereof and forcing the piston 10 to the left hand end of the cylinder. The movement of the carriage to the left carries with it the longitudinal shaft 56 and the contact plate or head 62. This will enable the outer end of the container 25 to be fitted in the opening of the frame plate 23 and the inner end of the container to be fitted around the lip 27 of the plate 28 located at the left hand end of the mold. The outer or left hand end of the container abuts against the spring pressure plate 63 which holds the container firmly in position.

After the container has been placed in position the carriage is moved to the right and returned to its initial position by introducing compressed air into the cylinder 11 and at the left hand end thereof and exhausting the compressed air from the cylinder at the right hand end thereof. The butt end plate 42 is then set in place and the unit composed of the shank end plate, the bolt 51, the spring pressure plate 54 and the coiled spring 55 are placed in position, the headed end of the bolt 51 being engaged with the pronged hook 73. The shank end plate 42 rests upon the bottom of the mold and the bolt rests in the recess or bifurcation between the engaging portions 74 of the hook. The yoke 49 is not placed in position until after the ham has been shaped and pushed into the container.

The ham is dropped into the compression chamber with the butt end to the left and turned so that the thickest portion of the ham is in a vertical diretcion and reposes nearest to the left end of the compression chamber. Compressed air is then introduced into the cylinder 41 and the piston 40 and plunger 36 are moved downwardly, thereby pressing the ham and causing the same to occupy completely the lower portion of the compression chamber of the mold. The compression chamber is of the same cross section as the container and somewhat shorter than the container.

With the plunger held in its lowermost position compressed air is introduced into the right hand end of the cylinder 11 and the piston 10 and the carriage are moved to the left, thereby causing sliding of the pressed ham from the compression chamber of the mold to the container 25 and a continued movement of the carriage to the left forces the squared ham into the container.

During this movement there is no change of pressure on the meat product due to the equality of the tension springs 65 and 70 controlling end pressure on the meat product.

Figure 5:
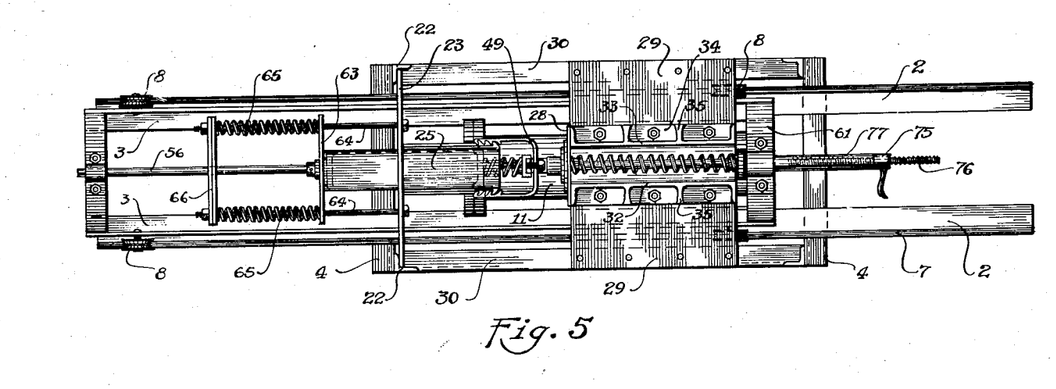
Fig. 5 is a similar view illustrating the arrangement of the parts after the carriage has been moved to the left at the completion of the ham shaping operation.
Figure 6:
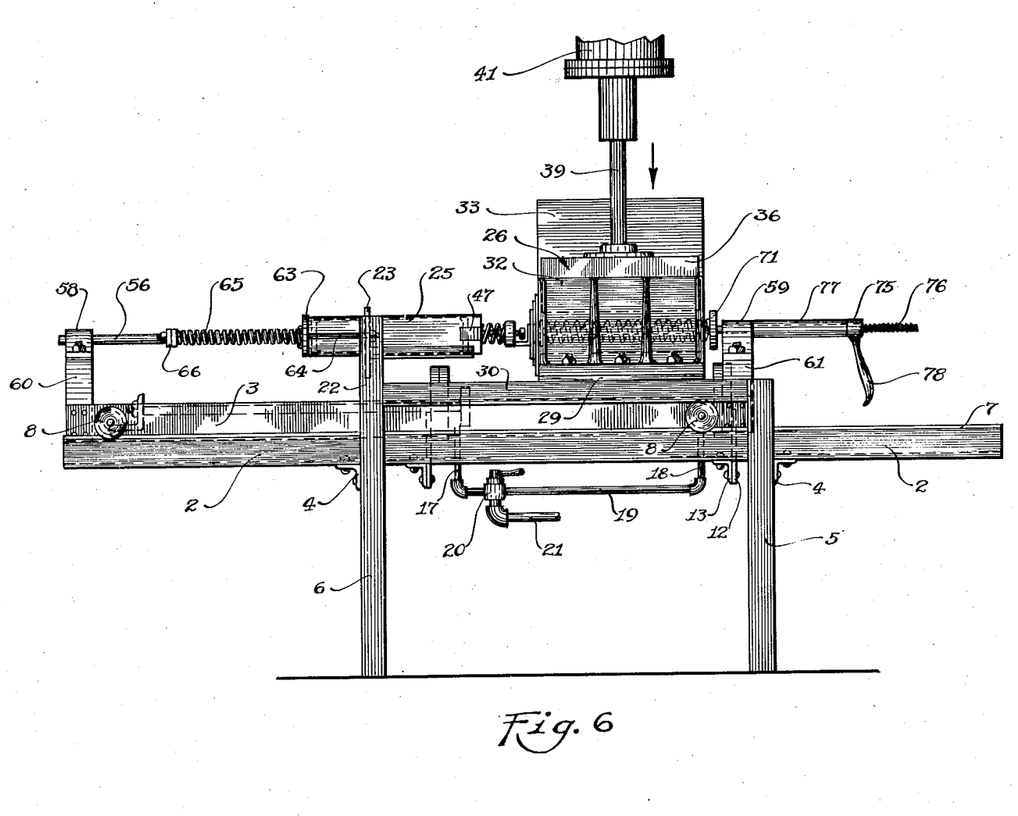
Fig. 6 is a side elevation of the machine, the parts being arranged as illustrated in Fig. 5.

When the carriage has reached the left hand end of its travel, the meat product has been pushed to the left hand end of the container 25, pushing before it the butt end plate 42 which closes the left hand end of the container except for the thin aperture 46 on each side of the butt end plate which permits escape of any free juices. At this time the shank end plate which forces the meat product into the container will have followed the meat to such a degree that the hexagonal head 53 of the screw 51 will be in the plane of the inner face of the frame plate 28 or slightly to the left of such position. The yoke 49 is then manually applied and engaged with the bolt 51 and the lugs 47 of the container. The spring 55 maintains a slight pressure on the shank end plate so that the meat product will retain its shape during cooking. The container is slidably supported in the opening 24 of the frame plate 23 and is adapted to be moved to the left entirely clear of the mold, as illustrated in Fig. 5 of the drawings to facilitate the ready application of the yoke to the container and the screw 51.

In order to remove the filled container from the machine, pressure at the right hand end of the container is reduced by means of a manually operable nut 75 arranged on an outer threaded portion 76 of the shaft 57 and engaged with the outer end of a sleeve 77 which is placed on the threaded portion 76 of the said shaft 57 in abutting relation to the adjacent bearing 59 of the pedestal member 61.

The nut 75 is provided with a suitable handle 78 to enable it to be readily rotated for withdrawing the shaft 57 against the action of the spring 70 to relieve the shank end plate of the pressure of the spring 70. This will also enable the pronged hook to be readily disengaged from the bolt 51 and the filled container may then be removed from the machine. While the manually operable nut 75 has been shown for relieving the shank end plate of the pressure of the spring 70, any other suitable means may, of course, be employed for moving the shaft 57 outwardly independently of the movement of the carriage.

What is claimed is:

1. A machine for shaping meat products and for thereafter serving as means whereby the shaped meat can be transferred into a container, which machine includes a main frame having a mold, a plunger movable in the mold to shape the meat product, means for supporting a container at one end of the mold in position to receive the shaped meat product with the bottom end of the container outmost, said container having a tubular body with an end plate movable along the interior thereof, a carriage movable on the main frame, means carried by said carriage for moving said end plate and for holding it adjacent the delivery opening of said mold, and means carried by the said carriage for forcing the shaped meat product from the mold into the container, the construction being such that when the shaped meat product is being forced from the mold into the container the end plate is moving from the mold to the outer or bottom end of the container.

2. A machine for shaping meat products including a main frame having a mold, a plunger movable in the mold to shape the meat product, means for supporting a container at one end of the mold in position to receive the meat product with the bottom end of the container outmost, said container having an inwardly extending flange portion at the bottom portion thereof and an end plate normally seated on said flange portion but mounted so that it can be moved along the inner portion of the container into operative relationship with respect to the mold, a carriage movable on the main frame, means carried by the said carriage and operable through the container for moving the end plate into operative relationship with the mold and for holding the end plate in position in respect to the mold during a shaping operation, and means operable through the mold for forcing the shaped meat product from the mold into the container, the construction being such that as the shaped meat is forced from the mold into the container the end plate simultaneously moves toward its normal position at the bottom of the mold.

3. A machine for shaping meat products including a main frame having a mold, a plunger movable in the mold to shape the meat product, means for supporting a container at one end of the mold in position to receive the meat product, a carriage movable on the main frame, and means carried by the said carriage and operable through the mold for transferring and forcing the shaped meat product from the mold into the container, said carriage also having thereupon means for maintaining a substantially uniform pressure on the ends of the shaped meat product during such operation of transferring the meat product from the mold to the container.

4. A machine for shaping meat products including a main frame having a mold, a plunger movable in the mold to shape the meat product, means carried by the frame for supporting a container at one end of the mold in position to receive the shaped meat product, a carriage mounted on the main frame and having means for engaging both ends of the meat product and movable on the main frame to force the shaped meat product from the mold into the container.

5. A machine for shaping meat products including a main frame having a mold, a plunger movable in the mold to shape the meat product, spaced means carried by the main frame for supporting a container at one end of the mold in position to receive the shaped meat product, one of the container supporting means slidably receiving the container and the other supporting means being located at the mold and removably receiving the said container, a carriage mounted on the main frame and having means for engaging both ends of the meat product and movable on the frame to force the shaped meat product from the mold into the container and also to slide the container to a position beyond the mold.

6. A machine for shaping meat products including a main frame having a mold, a plunger movable in the mold to shape the meat product, means for supporting a container at one end of the mold in position to receive the shaped meat product, a carriage movable on the main frame, means carried by the said carriage for forcing the shaped meat product from the mold into the container, and a horizontal cylinder mounted on the main frame and having a piston connected with the carriage for moving the same backward and forward to operate the said means for transferring the shaped meat from the mold to the container.

7. A machine for shaping meat products including a main frame having a mold, a plunger movable in the mold to shape the meat product, means for supporting a container at one end of the mold in position to receive the meat product, a carriage having a frame and movably mounted on the main frame, means carried by the said carriage for forcing the shaped meat product from the mold into the container, and a horizontal cylinder mounted on the main frame and located within the carriage frame and having a piston connected with the said carriage for moving the same backwardly and forwardly to operate the said means for transferring the shaped meat product from the mold to the container.

8. A machine for shaping meat products including a main frame provided with rails, a carriage having a frame and provided with wheels movable along the track, a cylinder mounted on the main frame and located within the frame of the carriage and having a piston connected with the said carriage, a mold located above the frame of the carriage and supported by the main frame, a plunger operating in the mold to shape the meat product, means for supporting a container at one end of the mold in position to receive the shaped meat product, and means carried by the carriage for forcing the meat product from the mold into the container.

9. A machine for shaping meat products including a main frame provided with rails, a carriage having a frame and provided with wheels movable along the track, a cylinder mounted on the main frame and located within the frame of the carriage and having a piston connected with the said carriage, a mold located above the frame of the carriage and supported by the main frame, a plunger operating in the mold to shape the meat product, means for supporting a container at one end of the mold in position to receive the shaped meat product, longitudinal shafts mounted on the carriage at opposite ends of the mold, and means cooperating with the inner ends of the shafts for engaging the ends of the shaped meat product, said carriage being movable to actuate the shafts to force the shaped meat product from the mold into the container.

10. A machine for shaping meat products including a main frame provided with rails, a carriage having a frame and provided with wheels movable along the rails, a cylinder mounted on the main frame and located within the frame of the carriage and having a piston connected with the said carriage, a mold located above the frame of the carriage and supported by the main frame, a plunger operating in the mold to shape the meat product, means for supporting a container at one end of the mold in position to receive the shaped meat product, longitudinal shafts mounted on the carriage at opposite ends of the mold, and butt and shank plates carried at and by the inner ends of the respective shafts, which butt and shank end plates are arranged to engage the shaped meat product at the ends thereof, said carriage being movable to actuate the shafts for forcing the meat product from the mold into the container.

11. A machine for shaping meat products including a main frame, a carriage movably mounted on the main frame, a mold located above the carriage and supported by the main frame, a plunger operating in the mold for shaping the meat product, means for supporting the container at one end of the mold in position to receive the shaped meat product, a spring contact plate bearing against the outer end of the container, guide rods mounted on the main frame and slidably receiving the spring contact plate, coiled springs disposed on the guide rods for holding the spring contact plate in engagement with the container, longitudinal shafts carried by the carriage and operating through the mold and the container for forcing the shaped meat product from the mold into the container, and a coiled spring mounted on one of the said shafts and opposed in its action to the said coiled springs and being substantially equal in strength to the same, whereby a substantially uniform pressure is maintained on both ends of the shaped meat product.

12. A machine for shaping meat products including a main frame, a mold supported by the main frame, a plunger operating in the mold for shaping the meat product, means for supporting a container at one end of the mold in position to receive the shaped meat product, a shaft located at the other end of the mold, a carriage movable back and forth on the main frame and supporting the said shaft, an end plate engageably and detachably connected with the said shaft for engaging the shaped meat product, and means for operating the carriage for moving the shaft to force the meat product from the mold into the container.

13. A machine for shaping meat products including a main frame, a mold supported by the main frame, a plunger operating in the mold for shaping the meat product, means for supporting a container at one end of the mold in position to receive the shaped meat product, a shaft located at the other end of the mold, a carriage movable back and forth on the main frame and supporting the said shaft, an end plate for engaging one end of the meat product, a stem connected with the end plate, a spring pressure plate mounted on the stem, a spring disposed on the stem and interposed between the pressure plate and the end plate, and means carried by the said shaft for engaging the spring pressure plate, said carriage being operable to move the shaft and the end plate through the mold for forcing the meat product from the mold into the container.

14. A machine for shaping meat products including a main frame, a mold supported by the main frame, a plunger operating in the mold for shaping the meat product, means for supporting a container at one end of the mold in position to receive the shaped meat product, a shaft located at the other end of the mold, a carriage movable back and forth on the main frame and supporting the said shaft, an end plate for engaging one end of the meat product, a stem connected with the end plate, a spring pressure plate mounted on the stem, a spring disposed on the stem and interposed between the pressure plate and the end plate, and a pronged hook carried by the shaft and straddling the stem and engaging the spring pressure plate, said carriage being operable to move the shaft and force the meat product from the mold into the container.

15. A machine for shaping meat products including a main frame, a carriage mounted on the main frame and provided with aligned bearings, a mold located above the carriage between the said bearings and supported by the main frame, a plunger movable in the mold for shaping the meat product, means for supporting a container at one end of the mold in position to receive the shaped meat product, longitudinal shafts slidable in the bearings of the carriage and carried by the latter, end plates associated with the inner ends of the shafts for engaging the ends of the shaped meat product, a spring contact plate slidably mounted on the main frame and yieldably maintained in engagement with the outer end of the container and having one of the shafts extended through it, a spring mounted on the other shaft for effecting a yielding engagement of one of the end plates with the meat product, means for moving the carriage to operate the shafts for forcing the shaped meat product from the mold into the container, and means for moving one of the shafts against the action of the said spring to relieve the meat product of the pressure of the same to facilitate removal of the container.

16. A machine for shaping meat products and for transferring the shaped meat product to a container, which machine includes a main frame, a carriage movably mounted on the main frame, a mold located above the carriage and supported by the main frame, a plunger operating in the mold for shaping the meat product, means for supporting the container at one end of the mold in position to receive the shaped meat product, a spring contact plate bearing against the outer end of the container, guide rods mounted on the main frame and slidably receiving the spring contact plate, coiled springs disposed on the guide rods for holding the spring contact plate in engagement with the container and means operative on the carriage and through the mold and into the container for forcing the shaped meat product from the mold into the container.

17. A machine for shaping meat product including a main frame, a mold supported by the main frame, a plunger operating in the mold for shaping the meat product, means for supporting a container at one end of the mold in position to receive the shaped meat product, a shaft located at the other end of the mold, a carriage movable back and forth on the main frame and supporting the said shaft, an end plate for engaging one end of the meat product, a pressure plate, a stem provided with a head and constituting a bolt construction connected with the end plate, which stem is arranged so that the bolt head is at the outer end of the stem, a spring disposed on the stem and interposed between the pressure plate and the end plate and a pronged hook carried by the shaft and straddling the stem and engaging the spring pressure plate, said carriage being operable to move the shaft and force the meat product from the mold into the container.

18. A machine for shaping meat product including a main frame, a mold supported by the main frame, a plunger operating in the mold for shaping the meat product, means for supporting a container at one end of the mold in position to receive the shaped meat product, a shaft located at the other end of the mold, a carriage movable back and forth on the main frame and supporting the said shaft, an end plate for engaging one end of the meat product, a pressure plate, a stem provided with a head and constituting a bolt construction connected with the end plate, which stem is arranged so that the bolt head is at the outer end of the stem, a spring disposed on the stem and interposed between the pressure plate and the end plate, a pronged hook carried by the shaft and straddling the stem and engaging the spring pressure plate, said carriage being operable to move the shaft and force the meat product from the mold into the container, the means for relieving the spring pressure on the pressure plate to permit the yoke to be inserted in place when the pronged hook passes the spring pressure plate along the stem in a direction away from the head.

JOSEPH BECH.

CERTIFICATE OF CORRECTION.

Patent No. 1,975,916. October 9, 1934.

JOSEPH BECH.

It is hereby certified that error appears in the printed specification of the above numbered patent requiring correction as follows: Page 3, line 143, for "diretcion" read direction; and page 6, line 113, claim 18, for "the" third occurrence read and; and that the said Letters Patent should be read with these corrections therein that the same may conform to the record of the case in the Patent Office.

Signed and sealed this 13th day of November, A. D. 1934.

Leslie Frazer (Seal)  Acting Commissioner of Patents.